United States Patent [19]
Cotton et al.

[11] 3,864,224
[45] Feb. 4, 1975

[54] PREPARATION OF OXIDES

[75] Inventors: Joseph Bernard Cotton, Sutton Coldfield; Peter Charles Steele Hayfield, Castle Bromwich; Ian Robert Scholes, Sutton Coldfield, all of England

[73] Assignee: Imperial Metal Industries (Hynoch) Limited, Warwickshire, England

[22] Filed: Apr. 25, 1972

[21] Appl. No.: 247,322

[30] Foreign Application Priority Data
Apr. 28, 1971  Great Britain .................... 11884/71

[52] U.S. Cl. ................................ 204/56 R, 204/10
[51] Int. Cl. ............................................ C23b 9/00
[58] Field of Search ...................... 204/56 R, 10, 96

[56] References Cited
UNITED STATES PATENTS

| | | | |
|---|---|---|---|
| 2,943,031 | 6/1960 | Wainer | 204/37 |
| 3,338,805 | 8/1967 | Pochily | 204/56 R |
| 3,488,265 | 1/1970 | Morris | 204/56 R |
| 3,645,862 | 2/1972 | Cotton et al. | 204/56 R |

FOREIGN PATENTS OR APPLICATIONS

| 22,858 | 8/1967 | Japan | 204/56 R |
|---|---|---|---|

*Primary Examiner*—T. M. Tufariello
*Attorney, Agent, or Firm*—Cushman, Darby & Cushman

[57] ABSTRACT

Preparing oxides of film-forming metals by inserting electrically conductive bodies in a solution containing ions of film-forming metals, and anodically precipitating said oxides upon the first body.

11 Claims, No Drawings

PREPARATION OF OXIDES

BACKGROUND OF THE INVENTION

This invention relates to the preparation of oxides of "film-forming metals." By the term film-forming metal is meant a metal which has anodic polarisation properties similar to those of titanium. The film-forming metals are referred to in this specification are titanium, tantalum, niobium, and zirconium.

The invention is concerned with methods of preparing oxides of film-forming metals and with the oxides when prepared by those methods.

It is an object of the present invention to provide an improved method of preparing oxides of film-forming metals.

SUMMARY OF THE INVENTION

In accordance with the present invention a method of preparing oxides of film-forming metals comprises taking a solution containing ions of at least one metal selected from titanium, tantalum, niobium and zirconium, inserting in the solution first and second electrically conductive bodies, and applying a voltage to the first electrically conductive body to render it anodic with respect to the second electrically conductive body so as to precipitate upon the first body oxides of the metal or metals of the solution.

Preferably at least the surface inserted in the solution of the first body is of a film-forming metal as herein defined or of an alloy based upon a film-forming metal.

The first or second body may provide a container for the solution.

The magnitude of the current density arising at the first body from the voltage applied thereto and the temperature of the solution can be such that said oxides are precipitated to form a deposit adhering securely to the first body. In this way there is produced a body carrying an adherent oxide deposit. This body may be of use in itself, but the present invention also envisages taking a body upon which has been precipitated a deposit adhering securely thereto by the method defined above, and applying to said deposit at least one layer of at least one further material. Alternatively said current density can have a magnitude and the temperature of the solution can be such that said oxides are loosely adherent or non-adherent to the first body. Said oxides are then removed from the first body or solution, washed free of the solution and preferably dried.

DESCRIPTION OF THE PREFERRED EXAMPLES

Typical examples of the invention will now be particularly described.

EXAMPLE 1

An expanded mesh body of commercial purity titanium was etched in 10% oxalic acid between 8 and 16 hours. The body was then supplied with a positive potential of 12 volts with respect to a lead cathode, and the body and cathode were immersed in a 7wt% sulphuric acid solution containing 5g/l of titanium as $Ti^{3+}$ ions. The anode current density was of the order of 60 amps/m$^2$. The solution was heated to and maintained at 90°C. (Lower temperatures can be used but this slows the rate of deposition.) A coating of a titanium dioxide layer was deposited upon the mesh body at a rate of approximately 2g/m$^2$/hr. A coating of 15g/m$^2$ was produced.

After coating, the body was washed in water and dried. The titanium dioxide coating was found to be firmly adherent to the titanium mesh substrate.

A coated titanium mesh body prepared in accordance with this Example was found to be useful in the heterogeneous catalysis of liquids or gases. To this end there were prepared a number of scrolls by loosely rolling a number of titanium dioxide coated mesh bodies, and the liquids or gases were streamed through the scrolls for catalysis to take place.

EXAMPLE 2

A sheet of titanium foil of about 0.13mm thickness was prepared for coating by being degreased and then etched in 10% oxalic acid for about 5 hours. The sheet was then provided with a coating of titanium dioxide in the same way as that described in Example 1 above, a coating of 20g/m$^2$ being produced. The coated sheet was then washed and dried and the titanium dioxide coating was found to be firmly adherent to the titanium foil.

Using nitrogen adsorption techniques the coating was found to have a real surface area of $3.2 \times 10^3$cm$^2$ for each apparent square centimetre of surface area, ie 5.5m$^2$/g. The average pore diameter is 200–1000A. Thus the coating is admirably suitable for acting as a carrier of one or more coating of catalytic material.

In a modification of this example the coating of titanium dioxide can be applied to other metals, for example when a substrate of titanium would be unsatisfactory due to insufficient mechanical strength or temperature resistance or through brittleness. A suitable alternative substrate material is stainless steel; a suitably roughened stainless steel specimen was inserted in a 7wt% $H_2SO_4$ solution containing 5g/l of titanium as $Ti^{3+}$ at room temperature, and the specimen was maintained at 150 millivolts (with respect to a saturated sulphate electrode) with a potentiostat. This deposited an adherent coating of 2g/m$^2$/hr. The stainless steel was not corroded.

EXAMPLE 3

To test the lubricant retention properties of a titanium dixoide coating produced in accordance with the invention a 6mm diameter rod of the commercially available titanium alloy Ti 318 which consists of 6wt% aluminium, 4wt.% vanadium, balance titanium, was provided with 15g/m$^2$ of $TiO_2$ in the same way as that described in Example 1 above. This rod was subjected to a Falex test by being pressed between a pair of mild steel V blocks and rotated under load at 290 revolutions per minute. Various lubricants were tried with the following results (the surface pressure figures given in parentheses are those calculated from the wear scar widths), viz:

1. Ti 318 + $TiO_2$ + SAE30 oil
    a. No coating failure after 1 hour at 100lbs. load (scar width 0.009 in; 11,100 psi)
    b. No coating failure at 4,000lbs in increasing load test (scar width 0.041in; 97,500 psi)
2. Ti 318 + $TiO_2$ + molybdenum disulphide
    a. No coating failure after 1 hour at 100lbs load (scar width 0.027in; 3,700 psi)
    b. No coating failure at 4,000lbs in increasing load test (scar width 0.022in; 182,000 psi)
3. Ti 318 + $TiO_2$ + polytetrafluorethylene a. No coating failure after 1 hour at 100lbs load (scar width 0.014in; 7,100 psi)
b. No coating failure at 3,200lbs in increasing load test (scar width 0.038in; 84,000 psi).

In comparison the same tests were repeated but without the titanium dioxide coating, and these yielded the following results:

1. a. Heavy wear was observed after 1 hour at 100lbs (scar width 0.086in; 1,160 psi)
   b. Maximum load attained 2,400lbs in increasing load test (scar width 0.075in; 32,600 psi)
2. a. Seizure imminent after 10 minutes at 100 1lbs
   b. Seizure imminent at 1,000lbs in increasing load test
3. a, b. Not carried out — could not obtain adhesion of polytetrafluroethylene coating.

Test results are given above for Ti 318 which has been provided with a titanium dioxide coating and then coated with polytetrafluorethylene (ptfe). Such ptfe coating can also be applied to commercially pure titanium for example for use in surgical implants. The titanium oxide coating also provides a good surface for bonding to adhesives; then were compared the peel strengths achieved by these commercially pure titanium specimens all tested in the same way and with the same adhesive, with the following results:

|   |                  | Mean peel load pounds force 25mm width |
|---|------------------|---|
| 1. | Untreated        | 9 |
| 2. | Etched           | 23 |
| 3. | Etched and coated | 35 |

The untreated specimen 1 was commercially pure titanium which prior to application of adhesive had been cleaned by a 90 second immersion in a solution of 2 volumes of concentrated hydrofluoric acid/10 volumes of concentrated nitric acid/88 volumes of water, followed by water rinsing and warm air drying. Specimens 2 and 3 had been identically etched in oxalic acid in the same way as that described in Example 1 above, and specimen 3 had been coated with titanium dioxide to a loading of 15g/m² in the same way as that described in Example 1. Shear tests were also carried out but the three specimens produced similiar results, failure occurring within the adhesive and not at the metal surfaces.

Many surface treatments and coatings which improve the wear resistance of titanium have a detrimental effect on its fatigue properties, these being degraded in some cases by as much as 50% Consequently direct stress, zero minimum, fatigue tests were carried out on plain test pieces of Ti 318 alloy and that alloy provided with a 15g/m² $TiO_2$ coating in accordance with Example 2 above. Results are presented below and substantiate an estimated reduction in the fatigue properties of only about 5%:

| Material | Applied Stress | Cycles to Failure (at 150 cycles per second) |
|---|---|---|
| Ti 318 | 0-70 hectobars | $> 2 \times 10^7$ (4 specimens) |
| Ti 318 + 15g/m² $TiO_2$ | 0-70 hectobars | $1.64 \times 10^7$ |
| Ti 318 + 15g/m² $TiO_2$ | 0-65 hectobars | $> 2 \times 10^7$ (2 specimens) |

EXAMPLE 4

A length of the commercially available annealed wire Ti 130 which is commercially pure, of 0.120 in diameter was cut into two lengths. One length was oxidised by being heated at 700°C for 30 minutes and air cooled. The other length was coated with 15g/m² of $TiO_2$ as described in Example 1 above. Both lengths were then drawn in two stages to a diameter of 0.102 in. using calcium stearate lubrication and the drawing loads measured for each pass. The loads were as follows:

| Pass | Drawing load (Kgs) at 6 ins/minute | |
|---|---|---|
|   | Annealed | $TiO_2$ coated |
| 0.120–0.108" | 217 | 186 |
| 0.108–0.102" | 111 | 101 |

The marked reduction in load shows the lubricant retention properties of the titanium dioxide coating.

EXAMPLE 5

This invention is further used in providing antifretting properties for titanium aircraft parts which are mechanically secured together, for example on turbine blade roots and their sockets in turbine discs. The antifretting properties were tested by pressing a titanium test piece between two pairs of rubbing pads and reciprocating the test piece to slide it between the rubbing pads at 2,300 cycles/minute. There were measured the maximum pressures that could be tolerated between the pads and the test piece, both having the same surface, for $10^7$ cycles without fatigue of the titanium test piece. The following results were obtained:

| Test piece and Pads | Maximum Pressure without Fatigue |
|---|---|
| Ti 318 (bare, polished) | 9 ton force/in² |
| Ti 318 (+ 15g/m² $TiO_2$ + polyimide resin + boron nitride) | 13 ton force/in² |
| Ti 230 (bare, polished) | 9.5 ton force/in² |
| Ti 230 (+ isocyanate cured epoxy + Mo $S_2$) | 12.0 ton force/in² |
| Ti 230 (+ 15g/m² $TiO_2$ + isocyanate cured epoxy + Mo $S_2$) | 15.0 ton force/in² |

EXAMPLE 6

This invention is also used in protecting titanium conductor and constructive parts for use in electrolytic cells, paticularly in the chlor-alkali electrolysis of brine. The electrolyte in such cells is itself corrosive, and this is aggravated by the fact that the electrolyte is normally at elevated temperatures typically in the region 70°–120°C. In these conditions there can develop the phenomenon known as "crevice corrosion" which occurs upon titanium parts which are confined, for example between the nut and the bolt of a titanium fixture. The temperature of the electrolyte may be augmented by electrical resistive heating if current is passing through the parts concerned. This was tested by using a tank of 6% brine saturated with chlorine into which was inserted a titanium disc lightly pressed against a titanium washer whereby crevices were created between the titanium washer and the annulus of titanium pressed thereagainst. The rear surface of the titanium disc was sealed in the mouth of a tube, and hot oil circulated in the tube. Measurements were taken of the oil temperature and brine temperature that could be tolerated by the titanium without crevice corrosion materialising. The results were as follows:

| Titanium disc and washer | Brine Temperature | Oil Temperature | Result |
| --- | --- | --- | --- |
| Bare Ti 130 | 70°C | 100°C | 7 days, no corrosion |
| Bare Ti 130 | 80°C | 110°C | 7 days, some crevice corrosion |
| Ti 130 coated with 15g/m² TiO₂ | Boiling | 135°C | 14 days, no corrosion |

EXAMPLE 7

The process of Example 1 was repeated on titanium granules having an average size of about 2–3mm diameter. The granules can be used in heterogeneous catalysis, or can be subsequently coated with a suitable catalytic material for this purpose.

Using granules of a much finer size, so that they are more accurately described as powders, these powders can be incorporated in synthetic plastic materials in order to assist in opacifying the polymer and providing it with some electrical conductivity to improve its antistatic properties.

EXAMPLE 8

The method of Example 2 was repeated but to the titanium oxide layer there was applied a number of layers of platinum group metals firstly by the application of a resinate paint of the platinum group metal concerned, followed by drying in air at about 250°C. and firing in circulating air at about 450°C. In this way there can be produced a layer of platinumiridium having the approximate properties of 70:30 between those two metals respectively, and this can be applied to a capacitor can body to serve as the cathode in the capacitor.

Using the platinum iridium paints just mentioned, or producing coatings of rhodium or ruthenium oxide, this Example can be applied to the manufacture of electrodes for use in electrode boilers. The titanium oxide layer improves the adhesion of the platinum group metal to the titanium substrate and increases the resistance of that substrate to corrosion by the solutions to which it is to be subjected.

EXAMPLE 9

The method of Example 1 was repeated to produce a titanium oxide coated titanium grid. This was electrolytically provided with a layer of lead. The resulting product was suitable for use as an electrode in environments in which there is normally used solid lead. Using a titanium grid increases the surface area of the lead electrode, and the layer of titanium oxide greatly improves the adhesion between the lead and the titanium grid.

In a modification of this Example, the titanium oxide covered titanium grid is provided with a thick layer of lead paste, and can then serve as an electrode in a lead acid accumulator. The titanium grid provides a mechanical support for the paste and is fast thereto through the titanium oxide layer.

EXAMPLE 10

The method of Example 1 was repeated with the solution at its boiling point and a small surface area/volume of solution. In this way the coating of a titanium dioxide layer was rapidly deposited upon the mesh body, ie in excess of 2g/m²/hr, but the adhesion of the titanium dioxide was very low and much of the oxide dropped to the bottom of the container during electrolysis. Most of the oxide adherent to the mesh was readily freed by tapping the mesh after removal from the solution.

In this way there was produced a large quantity of very fine grain titanium dioxide powder. The purity of the powder is exceptionally high because refined titanium is used to provide the titanium ions in the solution, and the solution itself acts as a further purifying step, providing of course that the other reagents and components in the method are of adequate purity. Hence the titanium oxide powder is exceptionally white and can be used for delustring fibres of synthetic material. The grain size of the powder can be adjusted by simple variation of the operating conditions.

In a modification of this example, the solution also contains salts of catalytic metals, whereby there is co-deposited with the titanium oxide powder oxides of those catalysts. As an example, germanium dioxide can be deposited with the titanium dioxide and this can be mixed into prepolymer mixtures of glycol and terephthalic acid to catalyse the production of terylene and simultaneously provide a delustring effect on the eventual fibre.

In the Examples given above, the solution used for depositing oxides of film-forming metals was exemplified by sulphuric acid. This can be modified, when the body to be coated is suitable, by using any one of the following acids and conditions of use. The rate of deposition that was achieved on titanium is also given:

| Acid | Strength | Content of Ti, voltage and temperature | Deposition rate |
| --- | --- | --- | --- |
| Hydrochloric acid | 20vol% | 5g/l 6V 90°C | 3g/m²/hr |
| Sulphamic acid | 20wt% | 5g/l 12V 90°C | ½g/m²/hr |
| Sulphamic acid | 10wt% | 1g/l 12V 90°C | ½g/m²/hr |
| Phosphoric acid | 15.4wt% | 4.3g/l 12V Boiling | 2g/m²/hr |

Adherent coatings of $TiO_2$ can also be obtained on the film-forming metals other than titanium, ie niobium, zirconium and tantalum, for example using 7wt% sulphuric acid containing 5g/l of titanium as $Ti^{3+}$ ions. For good adhesion, the specimens should be vacquablasted before coating.

We claim:

1. A method of preparing a titanium oxide comprising taking an acid solution containing titanium cations, inserting in the solution first and second electrically conductive bodies, and applying a voltage to the first electrically conductive body to render it anodic with respect to the second electrically conductive body and precipitating a porous coating of titanium dioxide alone upon the first body.

2. A method according to claim 1 wherein the surface of the first body is a film-forming metal or of an alloy based upon a film-forming metal.

3. A method according to claim 1 wherein the magnitude of the current density arising at the first body from the voltage applied thereto, and the temperature of said solution, are such that said oxides are precipitated to form a deposit adhering securely to the first body.

4. A method according to claim 1 wherein the magnitude of the current density arising at the first body from the voltage applied thereto, and the temperature of said solution, are such that said oxides are precipitated to form a deposit which is loosely adherent or non-adherent to the first body.

5. A method according to claim 1 wherein said solution is based upon an acid selected from the group consisting of sulphuric acid, hydrochloric acid, sulphamic acid and phosphoric acid.

6. A method according to claim 1 wherein the solution is maintained at a temperature of about 90°C.

7. A method according to claim 2 wherein said first body is of titanium or of an alloy based upon titanium.

8. A method according to claim 1 wherein the first body is stainless steel.

9. A body having securely adherent thereon a coating of titanium oxide of a film-forming metal prepared in accordance with claim 3 herein.

10. Film-forming titanium oxide powders prepared in accordance with claim 4 herein.

11. A method of preparing titanium dioxide comprising inserting first and second electrically conductive bodies in an acidic aqueous solution containing titanium cations and depositing a porous coating of titanium dioxide alone from said solution on to said first conductive body by applying a voltage across said conductive bodies to render said first body anodic with respect to said second body.

* * * * *